United States Patent [19]

Rossiter

[11] 3,918,813

[45] Nov. 11, 1975

[54] OPTICAL COLLIMATING ALIGNMENT UNITS

[75] Inventor: Michael Weston Rossiter, Salisbury, Australia

[73] Assignee: The Commonwealth of Australia, Parkes, Canberra, Australia

[22] Filed: Mar. 25, 1974

[21] Appl. No.: 454,378

[30] Foreign Application Priority Data
Mar. 28, 1973 Australia.............................. 2779/73

[52] U.S. Cl. .................... 356/153; 33/241; 33/285; 350/10; 350/23; 356/138
[51] Int. Cl.² ........................................ G01B 11/26
[58] Field of Search .......... 356/138, 153; 350/8, 10, 350/21, 22, 23, 24, 301; 33/241, 285

[56] References Cited
FOREIGN PATENTS OR APPLICATIONS
1,099,213   2/1961   Germany .......................... 356/153
1,094,485   12/1960  Germany .......................... 356/153

Primary Examiner—Vincent P. McGraw
Attorney, Agent, or Firm—Waters, Schwartz & Nissen

[57] ABSTRACT

An optical viewing alignment unit which includes a collimator on a main body optically directed to a beam splitting cube located in an optical viewing system, the face of the cube opposite the collimator being reflective, the collimator including an illuminated graticule whereby the collimator produces a datum image of the graticule directed through the same optical viewing system as the image.

8 Claims, 4 Drawing Figures

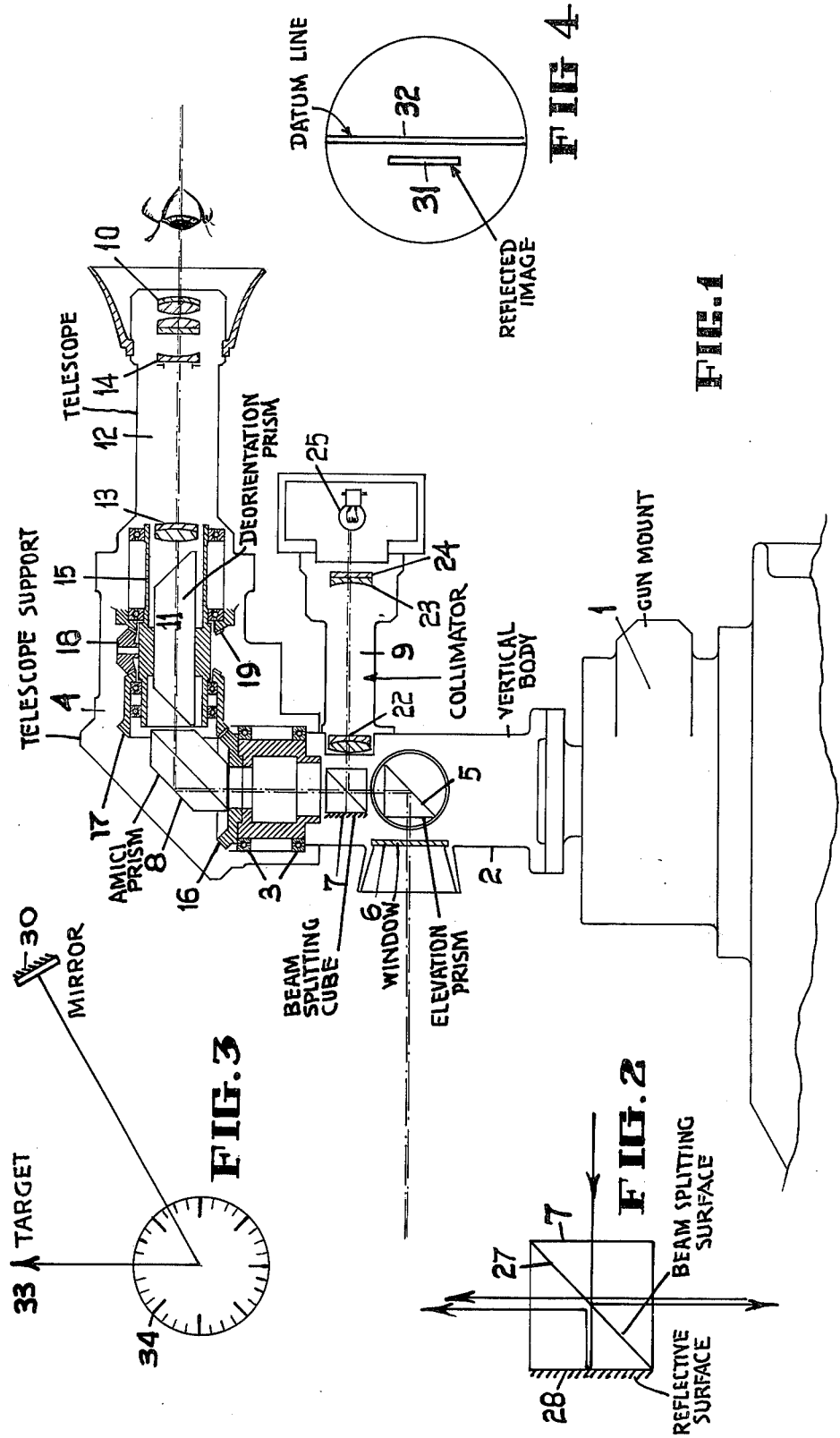

OPTICAL COLLIMATING ALIGNMENT UNITS

This invention relates to an optical collimating alignment unit, and while a particular application is to artillary gun sights, other applications will be apparent.

BACKGROUND OF INVENTION

A gun sight is an optical instrument used to aim an artillery gun in azimuth. In the usual arrangement the instrument embodies a telescope, is periscopic in form, and has a head prism which accepts light from targets at small elevation angles. Light from the target scene is transferred down through a vertical section, housed within the main body, to a horizontal section, attached to the main body, which terminates in a viewing eye-piece. Commonly the body of the instrument is rigidly attached to a gun mount which moves with the weapon as this is trained in azimuth.

The head of the gun sight is usually rotatable in azimuth with respect to the body. The head prism may be rotated about a horizontal axis to elevate or dip the instrument line of sight.

Gun sights usually embody a graduated circle (or dial) which provides a means for setting the gun bearing. These instruments are commonly referred to as "dial sights", or panoramic telescopes.

The sight-line as determined by the orientation of the head, may be either locked to move in azimuth as the gun is moved or released to rotate independently. In the latter mode the graduated circle or bearing scale indicates the azimuth offset of the sight line to the gun axis.

An observer on the gun carriage does not change his viewing position when the line of sight is changed. The gun sight works as a Panoramic Periscopic Telescope with the head prism revolving and nodding to determine the sightline.

An important characteristic of the gun sights under discussion is that they maintain an erect image, at all time, despite a changing angle between eye-piece and head prism. Without special optical compensation the target image would revolve about the line of sight.

To achieve this, a derotation prism is used which turns, inside the instrument, at exactly half the speed the head prism turns in azimuth. This prism is commonly of the "Dove" type but "Pechan" types are also used. The position of the derotation prism in a system is partly dictated by aberrations. It is not possible to place the conventional Dove prism in a converging pencil of rays as it is with the Pechan type, hence, the former must always be in parallel light viz. precede the objective lens and graticule.

In an older type of gun sight, Dove prism in situated in the vertical main body of the instrument in the parallel light section under the rotatable head prism. The telescope comprising objective and eye-piece is cranked through 90° by a right angle prism with a roof on the hypotenuse face (Amici Prism). A graticule (or reticle) is placed at the focus of the objective lens where the target scene is superimposed. The telescope primary focus is normally set for viewing targets at infinity and is not adjustable. For night-time use, it is necessary to illuminate the graticule by means of a torch shone through a window adjacent to the eye-piece.

According to a newer type of gun sight the parallel light section extends from the rotatable head prism to the first objective lens which then converges the beam to form a real image at a graticule placed in the vertical main body. A penta prism is conveniently utilized to turn the 90° corner after which a copying lens system forms a second real image in front of the eye-piece. A Pechan type derotation prism is situated in the converging pencil coming out of the copying system. For night-time use the instrument would require some kind of graticule illumination.

SOME ACCURACY CONSIDERATIONS

The bearing of a target is measured as the difference in azimuth angle between it and some other known point when both are referred back to the graduated circle. All references back to the graduated circle first require visual alignment of a point in the field to be made with a line scribed on the graticule. In general imperfections in the geometric truth of an instrument displace the image of the target scene from its true position with respect to the graticule and cause errors in setting and hence measurement.

In particular, a prime source of error, sometimes called "circle" error, (not to be confused with circle centering error) is particularly troublesome in the older type instruments. It arises to a large extent from inaccuracies, both optical and mechanical, in the Dove prism and in its mounting in the instrument. Inclination errors of the Dove prism to the optical axis occur from skew mounting and play in bearings etc. This inclination causes a tilting of the reflecting face of the Dove prism causing an image of a target on the graticule to be laterally displaced from the position it would have occupied if such errors had not been present.

The circle error arising from Dove prism inaccuracies is obviated in the newer type instrument by placing the derotation prism after the objective lens and graticule. Misalignment inaccuracies during rotation of this Pechan type prism displace both the graticule and target images together by identical amounts. As previously mentioned it is not possible to place a Dove prism in a similar location within the optical system.

Frequently in service it is not possible or desirable to use a distant marker as a reference point for gun laying. For this reason gun sights are frequently used in conjunction with auxiliary aiming points. One simple auxiliary aiming point, commonly called a paralleloscope, comprises a flat mirror facing the gun sight. The reference direction for the gun sight, in this case, is the direction normal to be mirror. This bearing reference is established by directing the line of sight towards the mirror so as to obtain a reflected image of the front window of the instrument centered on the graticule reference line. This procedure is called autoreflecting. As the mirror is, of necessity, placed close to the gun sight (several meters), the reflected image of the instrument head will be out of focus on the graticule for the normal instrument in its infinity focussed condition. As a result, considerable parallax will be present between the graticule and the image of the head giving rise to a high risk of serious alignment errors, and inaccuracy of gun laying.

Objects of the present invention are to improve accuracy and also to provide a generally better system.

SUMMARY OF INVENTION

According to this invention the optical system which can be applied to an inverted periscopic configuration but is equally applicable to conventional periscopic systems, utilizes the simple optical components of the former type gun sight, but in modified form, plus a collimator and a beam splitting cube, and while it may be used in conjunction with a conventional graduated circle, angular measurements are preferably made by means of a shaft encoder, the readout from which replaces the data derived from the combination of human eye, graduated circle and associated mechanisms in the older types of instrument. The expression "Cube" is used in the sense of general purpose rather than a geometric cube.

The invention, as applied to a gun sight, does not contain a conventional graticule for alignment purposes. Instead, it features a narrow vertical distinctive (green/yellow) line, viewed through the eye-piece, which is generated by an illuminated slit within the collimator. The collimator is an integral part of the gun sight and each part of the slit produces an output beam of parallel light. The output from the collimator is divided into two parts at the diagonal face of the beam splitting cube.

The beam splitting cube is a feature unique to this invention, but in this invention it is not a conventional beam splitting cube, but one having an extra reflecting face and this makes the whole system feasible.

After division one part is reflected downwards and is turned through about 90° by the elevation prism. It is then transmitted out through the front window of the instrument. The other part is transmitted through the diagonal surface and following full reflection at the back face of the cube is partly reflected upwards from a diagonal surface through Amici and Dove prisms to the telescope objective lens which forms a real image of the slit near the field lens of the eye-piece. This distinctive, preferably coloured, image of the slit is the datum for all alignment.

BRIEF DESCRIPTION OF DRAWINGS

FIG. 1 is a schematic sectional view of a gun sight according to this invention, FIG. 2 is an enlarged schematic view of the special beam splitting cube, FIG. 3 is a view showing the principle of autoreflection and autocollimation as used in gun laying, and FIG. 4 is a view depicting the appearance of the aligning image and the reflected image during autocollimation.

DESCRIPTION OF PREFERRED EMBODIMENT

The mount 1 of the gun sight carries the vertical main body 2 of the unit which in turn rotationally supports, by bearings 3, the telescope support 4 of the gun sight.

This ensures that the operator can move to any position to avoid obstruction of the sight line.

The main body 2 is hollow and carries the elevation prism 5 and the window 6.

The beam splitting cube 7 is disposed between the Amici prism 8, which gives left to right correction, and the elevation prism 5, and directs an image of a slit graticule from the collimator 9 through the beam splitting cube 7 to the eye-piece 10 after passing through the Dove prism 11 and the lenses of the telescope 12 which includes the doublet 13 and field lens and stop 14 where the real image of the collimator slit is formed. This is the datum line.

The Dove prism 11 is supported in the sleeve 15 which is driven by the gear 16 which is fixed to the vertical body 2 and drives a secondary gear 17 when the telescope support 4 of the gun sight is orientated about the axis of the main body, but this gear 17 is free to rotate on the sleeve 15 but is connected by at least one pinion 18 to a gear 19 fixed to the telescope support 4, the spindles of the pinions 18 being secured to the sleeve 15 to thereby rotate the Dove prism sleeve 15 at half speed in relation to orientation of the telescope support 4 of the gun sight about the axis of the body 2.

The collimator 9 comprises a doublet lens 22 and a slit graticule 23 and a diffuser 24, this producing a beam of light capable of providing reference images at the field lens, a light source 25 providing the illumination for the slit.

The beam splitting cube 7 is shown more particularly in FIG. 2 where the beam splitting surface is designated 27 and the reflective mirror face is designated 28, this being disposed at a 45° angle to the beam splitting surface. Such a cube can pass light through the inclined beam splitting surface and light projected into it towards the mirror surface of the cube is reflected both ways in the same path as the light which passes through the cube from an outside target.

When the gun sight is used in conjunction with a bearing reference unit, the device contains a mirror 30 for alignment of the gun sight by autocollimation (see FIG. 3). The light projected from the gun sight can be used by telescope on the bearing reference unit for initial alignment of the system. When used in the autocollimating mode that part of the light transmitted from the gun sight is reflected by this mirror 30. When the gun sight is turned to align with its own image in the mirror 30 (autoreflection) its own line of sight becomes normal to the mirror surface. In this condition light, originally from the collimator and transmitted from the gun sight, through the window 6 by the mirror 30 to reenter the instrument, along with other light from the surrounding scene, and can be seen as a small line image 31 (FIG. 4) in the observer's field of view. Final alignment is effected by autocollimation and consists of simply superimposing the shorter coloured line 31 behind the longer datum line 32 which results from the direct projection from the collimator upward through the beam splitting cube 7. The target direction is indicated by the line 33 and the graduated circle 34 axially above the centre of which the body 2 is disposed.

It is now evident that in the area above the beam splitting cube 7 three separate beams of light are mixed together. These beams comprise:
a. The datum line image 32
b. The reflected line image 31
c. The scene Any imperfection in the optical and mechanical system following the beam splitting cube 7 will affect all three beams in an identical way. Therefore, no bearing error is introduced on this account. Specifically, there are no bearing errors introduced by the above imperfections in either the autocollimating mode or in the direct laying mode using targets at infinity. Further, when used in the autocollimating mode there is no parallax error between the distinctive line images as is grossly evident in the former type gun sights when viewing close targets or in the autoreflecting mode. As with other gun sights the present gun sight may also be aligned on distant targets with no parallax error between the distinctive datum line 32 and the distant target images.

Night-time use is similar to day-time use and requires no additional illumination of the reference line. A dimming control may be provided to reduce the intensity of illumination of the slit for lower ambient light levels.

It is to be noted in the system of this invention that several features are worthy of consideration, all of which are associated with the principle of mixing beams of light.

Autocollimation has previously been used in general optical engineering, but no previous use has been made of this technique for aligning gun sights. Its advantages lie in an inherent two times increase in image displacement giving rise to a two times increase in accuracy over conventional auto-reflecting methods, and in overcoming the gross parallax errors experienced with the former type gun sights.

The principle of mixing the datum line beam into the beam containing the scene and reflected line images is the secret of dynamic accuracy. That is, it overcomes the problem of errors introduced by inaccuracy in moving parts. Application of this principle immediately allows a relaxation of manufacturing tolerances on both optical and mechanical components. The resultant is a saving in manufacturing costs, coupled with a greater accuracy than was previously attainable with this single type of optical system. Obviously this principle has important application in commercial optical instruments used for measuring and alignment where these embody moving parts which may disturb the optical axis of the instrument.

Practical tests in the laboratory have shown that by using this new system the setting accuracy of the gun sight by autocollimation is up to an order of magnitude better than the former type with its instrument errors used in autoreflection, and the time required to effect alignment is also reduced.

Further it is evident that by using this new system the measurement of bearing angles will be similarly increased in accuracy due to configuration of this system.

It is to be realised that the features described are not confined to a particular gun alignment system. The principles involved are equally applicable to other military and commercial optical devices, such as clinometers, range finders, levels, theodolites and the like.

I claim:

1. An optical collimating alignment unit comprising a main body, an optical viewing system associated with said body including a viewing window and a telescope and prisms directed to produce an image at a field lens of the telescope viewable through an eyepiece, support means supporting said optical viewing system on said main body to provide relative rotation therebetween, a beam splitting cube located in said optical viewing system near said window, a collimator on said main body optically directed towards said beam splitting cube, said collimator having an axis normal to the axis of the viewing system at the cube and said cube having a face opposite to the collimator which is reflective, said collimator including an illuminated graticule whereby said collimator produces, at the field lens a datum image of the graticule direction through the same optical viewing system as the image which is viewed through the said window.

2. An optical collimating system according to claim 1 wherein the collimator projects an image from the graticule outwards from the window which can be autocollimated from a mirror placed remotely from the window with its reflecting surface normal to the viewing axis whereby the reflected image passes through the said beam splitting cube to the field lens for registry with the datum image reflected to the field lens from the said reflective face of the said beam splitting cube.

3. An optical unit according to claim 1 wherein the main body is vertically disposed and supports said window, said beam splitting cube and said collimator, an elevation prism in said main body between said window and said beam splitting tube to project a scene from the window along the axis of said vertical body, said support means comprising a telescope support mounted on said body for rotation about the axis thereof, a telesope supported in said telescopic support, an Amici prism disposed in said telescope support with its reflecting surface disposed at the intersection of the axis of said telescope support and a derotation prism, and means supporting said derotation prism in said telescope support between the beam splitting cube and the telescope for rotation about its axis at half the speed of the rotation of the telescope support about the said body.

4. An optical unit according to claim 3 wherein the means supporting the derotation prism comprises at least one pinion for rotating said derotation prism, said pinion having teeth engaging on one side a gear fixed to said telescope support and on the other side a secondary gear driven by a further gear disposed on said body coaxially with the axis of said body.

5. An optical unit according to claim 3 wherein said derotation prism is disposed between the Amici prism and the telescope.

6. An optical collimating alignment unit wherein the bearing of a target is measured as the difference in azimuth angle between it and a known point and including an optical viewing system which comprises an objective lens and eye-piece, a beam splitting cube having a diagonal reflective surface directly through which the scene is viewed, a collimator which produces an illuminated reference image, the reference image being reflected by said beam splitting cube outwardly along the line of viewing of the scene and also being back-reflected by a mirror surface on said cube to be projected oppositely along the viewing system to the eye-piece whereby both the outwardly projected reference image and the directly reflected image can be aligned when the outwardly projected reference image is back-reflected into the optical viewing system.

7. An optical collimating alignment unit wherein the bearing of a target is measured as the difference in azimuth angle between it and a known point which comprises
   a. a hollow body having its axis vertically disposed and adapted to be connected to a device such as a gun to be aimed,
   b. a window in said body to transmit light,
   c. an elevation prism at said window supported in the said body to reflect the scene from the window through said body along the axis of the said body,
   d. a telescope support carried by said body orientable about the said body axis and including a telescope comprising an objective lens, a field lens and an eye-piece,
   e. a prism in the telescope body reflecting the scene from the window into the said telescope,
   f. a derotational prism in said telescope support between said prism in the telescope body and the said telescope geared to rotate at half the orientation speed of the telescope support about the said body;
   g. a beam splitting cube arranged on the said axis between the said elevation prism and the said prism in the telescope body positioned to allow the scene to be projected through it, said beam splitting cube having a diagonal beam splitting surface and having one reflective mirror face disposed in a plane parallel to the body axis, h. a collimator comprising a lens, a split graticule and a light source mounted on said body and optically directed to the face of the said beam splitting cube opposite to the said mirror face, whereby said beam splitting surface in the said beam splitting cube directs the slit image from the collimator on the one hand to the elevation prism and out through the window and on the other hand through the said beam splitting surface int the beam splitter to the mirror surface of the beam splitter and back to the said beam splitting surface and thence to the prism in the telescope support and through the derotation prism and telescope to be visible in the eye-piece, and i. an autocollimating mirror positioned remotely from the window to be normal to the line of sight from the window whereby alignment of the unit occurs when the back reflected slit image from the autocomminating mirror is aligned with the directly produced slit image viewed in the said eye-piece.

8. The method of optically aligning a gun or other device with a fixed reference point which comprises utilizing an optical viewing system which has associated with it a collimator which produces an illuminated reference image and superimposes the reference image in to the said viewing system to appear in the eye-piece of the viewing system as well as being directed outwardly in the viewing system by use of a beam splitting cube having a diagonal beam splitting surface and a mirror surface arranged at a 45° angle to said beam splitting surface, and back reflecting the outwardly directed reference image from a fixed autocollimating mirror back into the viewing system wherein alignment occurs when both images coincide at the eye-piece of the viewing system.

* * * * *